UNITED STATES PATENT OFFICE.

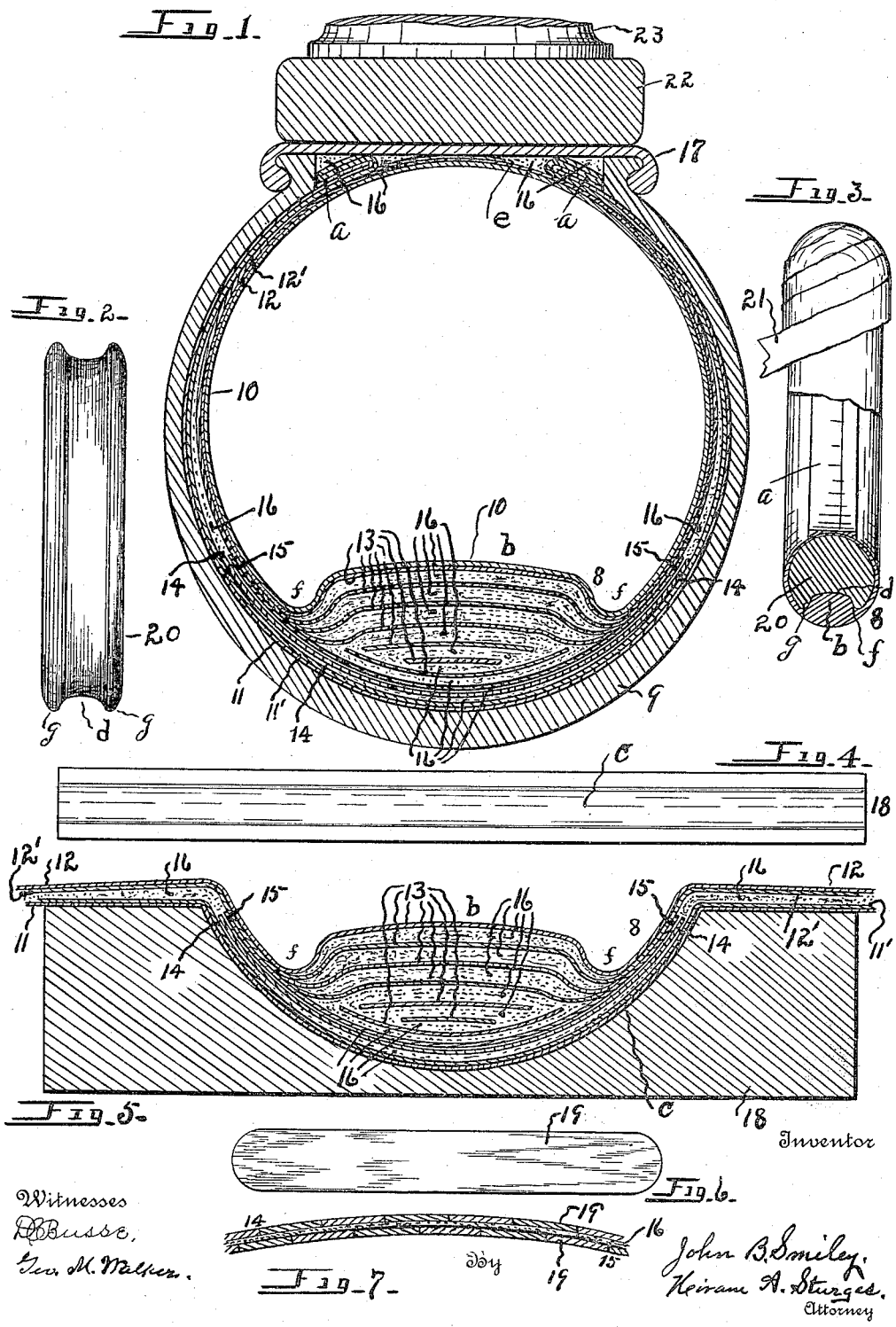

JOHN B. SMILEY, OF SOUTH OMAHA, NEBRASKA.

INTERMEDIATE SHIELD FOR PNEUMATIC TIRES.

1,160,334.  Specification of Letters Patent.  Patented Nov. 16, 1915.

Application filed October 16, 1913.  Serial No. 795,445.

*To all whom it may concern:*

Be it known that I, JOHN B. SMILEY, a citizen of the United States, residing at South Omaha, in the county of Douglas and State of Nebraska, have invented certain new and useful Improvements in Intermediate Shields for Pneumatic Tires, of which the following is a specification.

This invention relates to intermediate shields for pneumatic tires, and has for its object to provide a simple and inexpensive shield for the combined purposes of preventing puncture of the inner inflated casing, providing additional resiliency, and for preventing the cutting of the casings from action of the rim, when the inner casing is deflated.

The invention also has reference to novel means for constructing the shield, and includes the process of its manufacture as well as the shield itself.

In describing the invention reference is made to the accompanying drawing, wherein—

Figure 1 is a view of a wheel tire in transverse section, showing the intermediate shield. Fig. 2 is a plan view, on a reduced scale, of a curing-wheel. Fig. 3 is a view, partly broken and in transverse section, of the curing-wheel, the shield and a part of a compress being also shown. Fig. 4 is a plan view of a mold. Fig. 5 is a transverse section of the mold on an enlarged scale, the shield, partly broken away, also being shown. Fig. 6 is a plan view of a metallic plate. Fig. 7 is a view in transverse section showing the arrangement of the metallic plates.

The shield 8 or shielding-strip for the inflated casing consists, in part, of strips of fabric 11, 11', 12, 12' and 13, all extending longitudinally of and adapted to be disposed between the outer casing 9 and inflated casing 10. The other parts of the shield consist of a first layer 14 of metallic strips, a second or inner layer 15 of metallic strips and a composition of matter 16 arranged in layers and so proportioned that the shield thus provided may longitudinally circumscribe the inner casing while supported by the outer casing, said shield or shielding-strip being provided at its edges with anchor-members or enlarged parts $a$ and having, midway between said enlarged parts $a$, an inwardly projecting part or barrier member $b$, the anchor-members or parts $a$ being adapted to be disposed between the flanges of the wheel-rim 17 for preventing a transverse movement of the shielding strip, and thereby maintaining the barrier-member $b$ in the vertical plane outwardly of the longitudinal axis of the tire.

The ingredients employed for the composition of matter provides a mixture which is adhesive and may be molded in any desired form, and when vulcanized it is elastic and has the consistency of rubber. A mold 18 may be employed having a length equal to the circumference of the casings and preferably having a groove $c$ conforming substantially to the curvature, in cross-section of the casing 9, and in which may be laid the strips of fabric 11 and 11', and when the shield is completed these strips are adapted to be disposed adjacent to the inner wall of casing 9.

Upon the strip of fabric 11' is then disposed a layer of the composition of matter. Layers 14 and 15 each consist of a plurality of substantially parallel metallic strips 19 (Fig. 6) placed side by side transversely of the tire and embedded in the composition of matter. The curvature of these strips, as shown in Fig. 1, corresponds substantially to the curvature, in cross-section, of the tire; and the metallic plates of said adjacently-disposed layers 14 and 15 are so arranged with reference to each other that the edges of the plates of one layer will be disposed midway between the edges of the metallic plates of the adjacent layer. Layers 14 and 15 provide a barrier extending entirely around the inner casing, and pieces of glass, nails or other objects which may penetrate the outer casing will be deflected by operation of layers 14 and 15, and said layers will protect the inflated tire from injury.

The anchor-members or enlarged parts $a$ of the shield may be formed by any suitable means, the means shown herein for this purpose being the end-portions of the flexible strips 11 and 11' which may be folded and a quantity of the composition of matter employed as shown in the drawing, and as above mentioned they operate to prevent a sidewise sliding movement of the shield after it has been placed between the two casings, this being desirable since the inwardly-projecting and comparatively thick annular portion $b$ should be maintained adjacent to the periphery of the casing.

In the construction of the shield, the particular number of comparatively narrow flexible strips 13 employed is not important, and I may use a greater or lesser number of these strips. They adhere to and are embedded in the composition of matter, and in connection with said composition of matter they form the inwardly projecting part or annular cushion $b$, having a less width than the width of the wheel-rim 17; and on occasions when the inner tire is deflated, the weight of the vehicle will cause this cushion to be disposed beneath and midway between the edges of the wheel rim in a manner to support the wheel-rim and to prevent said rim from cutting the casings.

In order that the shield may have elasticity and a degree of solidity sufficient to maintain, normally, the segmental form shown in Fig. 1, and to the end that it will be durable and that the metallic plates and strips of fabric will be maintained in the relative positions substantially as shown in the drawing, I employ a composition of matter consisting of a mixture of asbestos, cork, rubber, gasolene and paste, the asbestos, cork and rubber being ground or pulverized, said ingredients when thoroughly mixed being semi-plastic in consistency so that, while said mixture provides a filler between the fabrics and between the metallic plates, it will be adhesive and of such a degree of solidity that the several layers of the compound which may be of greater or lesser thickness, will maintain their form, when removed from the mold.

I have used to advantage for the above composition of matter, a mixture, in bulk, of pulverized asbestos, 10 per cent., pulverized cork, 10 per cent., pulverized rubber, 60 per cent., rubber-cement paste 20 per cent.; and have used a sufficient quantity of gasolene with said ingredients to provide a mixture which is semi-plastic. The asbestos is used for the reason that it is a nonconductor of heat; the use of cork is an advantage as a filler since it is of light weight; the rubber provides elasticity; the paste is adhesive; and the gasolene operates as a binder since the gas escapes during the operation of heating.

The proportions above named may be changed if desired to provide a greater or a lesser degree of elasticity for the shield. The asbestos may be omitted and 20 per cent. of cork may be substituted, or the cork may be omitted and 20 per cent. of asbestos may be used, the other parts and proportions remaining the same; and the quantity of rubber may be decreased if desired to 20 per cent., the asbestos and cork being increased to 20 per cent. each; or, if desired, the quantity of rubber may be increased to 80 per cent., the asbestos and cork being omitted; also the rubber-cement paste may be decreased to 10 per cent. if desired.

After the mold has been employed to form the shield, the latter will have a form, in cross-section, substantially as shown in Fig. 5, and it is then laid on a circular, metallic member 20, for convenience called a curing-wheel, the periphery of said member having a groove $d$ with a curvature corresponding to the curvature of the inner side of the shield. Compresses or wet bandages 21 (Fig. 3.) are then wound around the tire of wheel 20, the bandages also covering the shield, and said wheel and the shield thus supported, are then subjected to steam heat in a suitable curing vat similar to the curing vats used for ordinary rubber tires, the result of this exposure to the heat being that the composition of matter will be vulcanized and solidified to the consistency of rubber. The shield thus provided will have an elasticity substantially the same as rubber, and the metallic layers and fabric strips will be embedded therein so that they will be maintained in substantially the relative positions shown in the drawing.

On account of the form of the shield it tends to prevent a "blow-out" in instances where the outer tire may be considerably worn or weakened. Wheel 20 should be constructed of metal so that it may be a good conductor of heat to cause vulcanization of both the inner and outer parts of the annular shield.

While I have shown and described a rectilinear mold 18 provided with a longitudinal groove, and while a mold is quite necessary for use in forming the several layers as well as a metallic mold for "curing" or vulcanizing the shield, I do not wish to limit myself in this respect, since molds of other forms may be employed.

The shield thus described provides a jacket which may completely envelop the inner casing, and the inner flexible strip should be of sufficient width to permit the parts near its edges to overlap, as indicated at $e$ in Fig. 1; and when the inner casing is inflated, the shield will operate to reinforce all parts of the casing so that the chances for an occurrence of a "blow-out" will be reduced to a minimum.

Numerals 22 and 23 indicate, respectively, the felly and one of the spokes of a vehicle wheel. While the construction as described is such that the inwardly projecting cushion $b$ of the shield will be normally disposed in the vertical plane of the longitudinal axis of the tire, and the annular recesses or grooves $f$ of the shield will be equi-distant from said axis and will correspond in curvature to the curvature of the annular ridges $g$ of the curing-wheel 20, this being the preferred construction, I do not wish to be understood as limiting myself to these features, the principal object of the invention being to provide a suitable mounting for the metallic plates which will be effective to permit layers 14 and 15 to expand and contract and also will be operative for maintaining them in the relative positions mentioned, and the composition of matter and its application as described, together with the operation of molding and vulcanization referred to have been found to be of advantage for these purposes.

Having fully described my invention, what I claim and desire to secure by Letters Patent is,—

An intermediate shield for pneumatic tires, comprising strips of fabric adapted to longitudinally circumscribe the inflated tire, a first layer consisting of metallic plates disposed side by side transversely of the tire intermediate the strips of fabric, a second layer of metallic plates disposed side by side inwardly of the first layer of metallic plates intermediate the strips of fabric with their longitudinal edges disposed midway between the longitudinal edges of the first layer of metallic plates, a plurality of flexible strips disposed outwardly of and circumscribing the inflated tire, an elastic filler disposed between the layers of metallic plates and between the strips of fabric and said layers of metallic plates, said elastic filler also enveloping each of said flexible strips to form adjacent to the tread an inwardly projecting annular ridge.

In testimony whereof I have affixed my signature in presence of two witnesses.

JOHN B. SMILEY.

Witnesses:
HIRAM A. STURGES,
L. M. THOMAS.

Copies of this patent may be obtained for five cents each, by addressing the "Commissioner of Patents, Washington, D. C."